(12) United States Patent
Yamanaka

(10) Patent No.: US 8,267,417 B1
(45) Date of Patent: Sep. 18, 2012

(54) BICYCLE BOTTOM BRACKET ASSEMBLY

(75) Inventor: Masahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/208,386

(22) Filed: Aug. 12, 2011

(51) Int. Cl.
*B62M 1/02* (2006.01)

(52) U.S. Cl. ............ 280/259; 74/594.1; 384/545

(58) Field of Classification Search .......... 280/259–261; 74/594.1; 384/545, 537
See application file for complete search history.

(56) References Cited

U.S. PATENT DOCUMENTS

| | | | |
|---|---|---|---|
| 4,848,938 A * | 7/1989 | Haas et al. | 84/606 |
| 5,414,784 A * | 5/1995 | Schulte et al. | 384/537 |
| 5,819,600 A * | 10/1998 | Yamanaka | 74/594.1 |
| 6,142,675 A * | 11/2000 | Brandenstein et al. | 384/537 |
| 6,983,672 B2 | 1/2006 | Smith | |
| 7,503,700 B2 | 3/2009 | Yamanaka | |
| 2009/0261553 A1* | 10/2009 | Meggiolan | 280/259 |

* cited by examiner

*Primary Examiner* — Anne Marie M Boehler
(74) *Attorney, Agent, or Firm* — Global IP Counselors, LLP

(57) ABSTRACT

A bicycle bottom bracket assembly is at least provided with a first support member and a first bearing unit. The first support member includes a first hanger mounting part and a first bearing mounting part. The first bearing unit is coupled to the first bearing mounting part. The first hanger mounting part has a first outer circumferential surface that is configured and arranged to be press-fitted into a first open end of a hanger part of a bicycle frame. The first hanger mounting part has a first slit extending in an axial direction relative to a rotational axis of the first bearing unit from an open axial innermost end of the first slit at least up to a region that is located radially outwardly from the first bearing unit in a radial direction relative to the rotational axis of the first bearing unit.

13 Claims, 4 Drawing Sheets

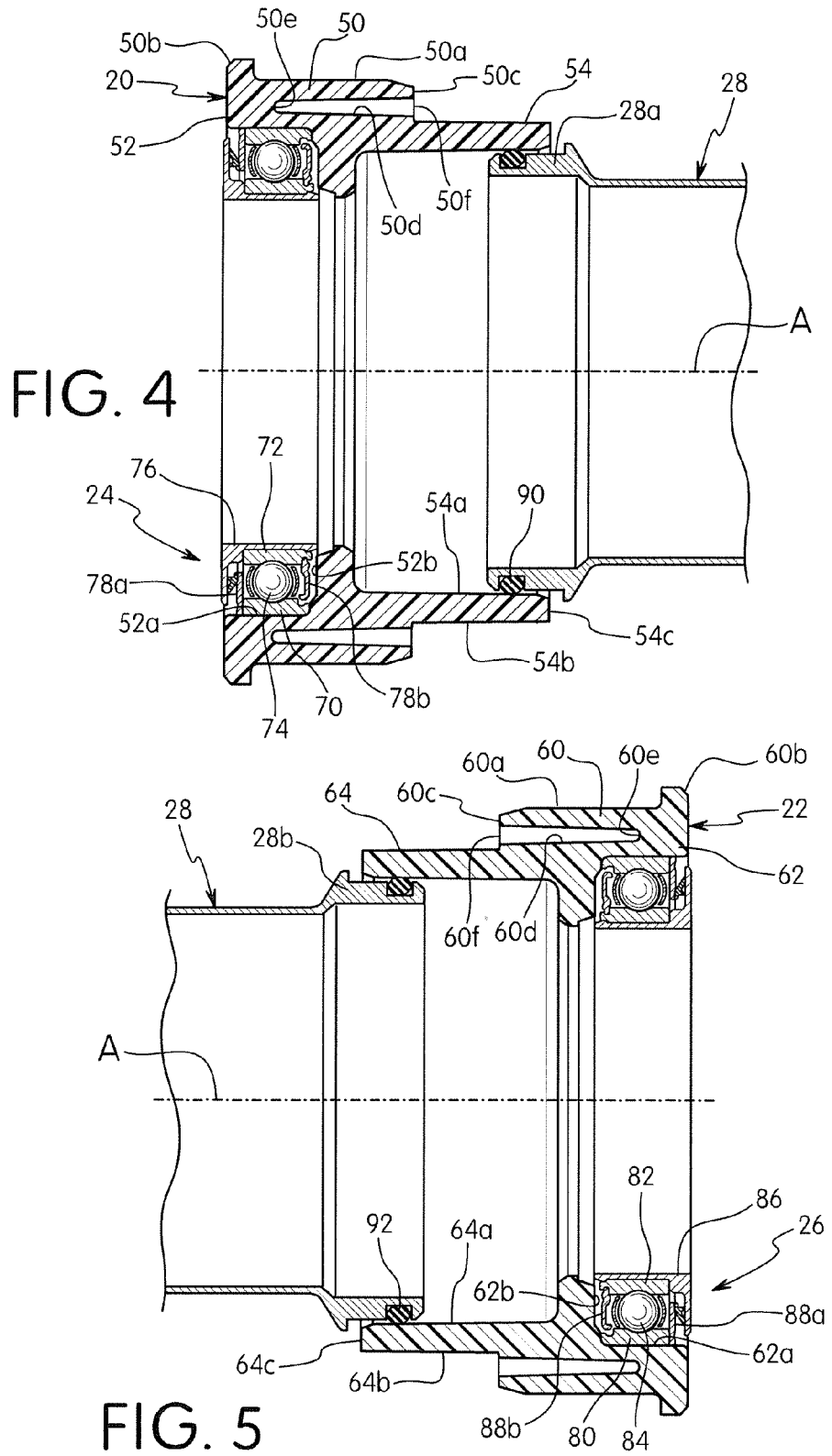

BICYCLE BOTTOM BRACKET ASSEMBLY

CROSS-REFERENCE TO RELATED APPLICATIONS

Background

1. Field of the Invention

This invention generally relates to a bicycle bottom bracket assembly. More specifically, the present invention relates to a bicycle bottom bracket assembly that is easily installed into a hanger part of a bicycle frame.

2. Background Information

Generally speaking, a conventional bicycle has a pair of wheels mounted to a diamond-shaped main frame formed of a plurality of tubes and a front fork pivotally connected to the main frame. The tubes of the main frame typically include a top tube, a down tube, a head tube, a seat tube, a pair of seat stays, a pair of chain stays and a cylindrical or tubular hanger part. The tubes of the main frame are fixedly coupled together to form a front triangularly shaped part and a rear triangularly shaped part that is arranged rearward of the front triangularly shaped part. The front and rear triangularly shaped parts serve as the framework of the bicycle body with a rear wheel mounted to the rear triangularly shaped part by a rear axle. The front fork is pivotally supported on the front triangularly shaped part such that the front fork can rotate freely about an axis that is tilted slightly from vertical. The front fork has a front wheel coupled thereto by a front axle.

The cylindrical or tubular hanger part of the frame is often called a bicycle bottom bracket hanger because it supports a bottom bracket. Many different types of bottom bracket are currently available on the market. Generally speaking, a conventional bicycle bottom bracket has a pair of bearings mounted into a tubular hanger part of a bicycle frame for rotatably supporting a crank axle. One type of a conventional crank axle assembly is disclosed in U.S. Pat. No. 6,983,672. This conventional crank axle assembly is equipped with first and second axle support members that have first and second bearings, respectively. The first and second axle support members are screwed into both end portions of the hanger part separately. The crank axle is rotatably supported on both of the first and second bearings, and right and left cranks are non-rotatably mounted on the both axial end portions of the crank axle. Sometimes the first and second axle support members are press-fitted in to both end portions of the hanger part. One example of a conventional crank axle assembly that has the first and second axle support members press-fitted into the hanger part is disclosed in U.S. Pat. No. 7,503,700.

In view of the above, it will be apparent to those skilled in the art from this disclosure that there exists a need for an improved bicycle bottom bracket hanger. This invention addresses this need in the art as well as other needs, which will become apparent to those skilled in the art from this disclosure.

SUMMARY

One aspect is to provide a bicycle bottom bracket assembly that is easily installed into a hanger part of a bicycle frame.

In view of the state of the known technology, a bicycle bottom bracket assembly at least comprises a first support member and a first bearing unit. The first support member includes a first hanger mounting part and a first bearing mounting part. The first bearing unit is coupled to the first bearing mounting part. The first hanger mounting part has a first outer circumferential surface that is configured and arranged to be press-fitted into a first open end of a hanger part of a bicycle frame. The first hanger mounting part has a first slit extending in an axial direction relative to a rotational axis of the first bearing unit from an open axial innermost end of the first slit at least up to a region that is located radially outwardly from the first bearing unit in a radial direction relative to the rotational axis of the first bearing unit.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure:

FIG. 4 is an enlarged cross sectional view of the left end of the bicycle bottom bracket assembly illustrated in FIGS. 1 to 3; and FIG. 5 is an enlarged cross sectional view of the right end of the bicycle bottom bracket assembly illustrated in FIGS. 1 to 3.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
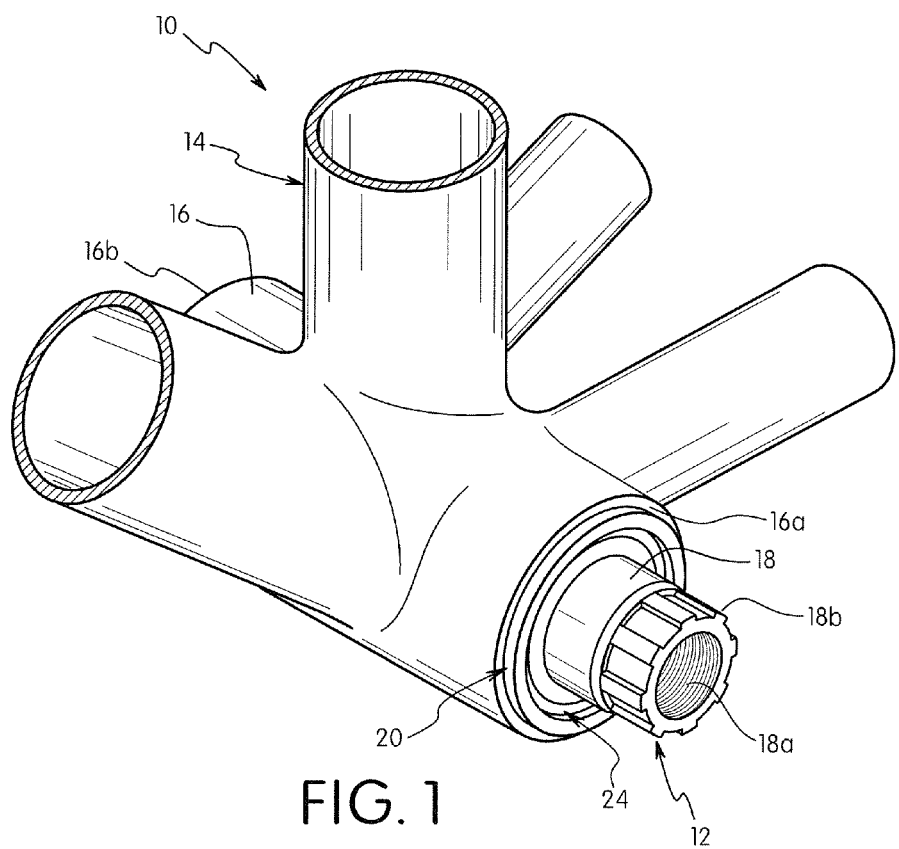
FIG. 1 is an enlarged, partial perspective view of a tubular hanger part of a bicycle frame with a bicycle bottom bracket assembly installed in the tubular hanger part in accordance with one illustrated embodiment.
Figure 2:
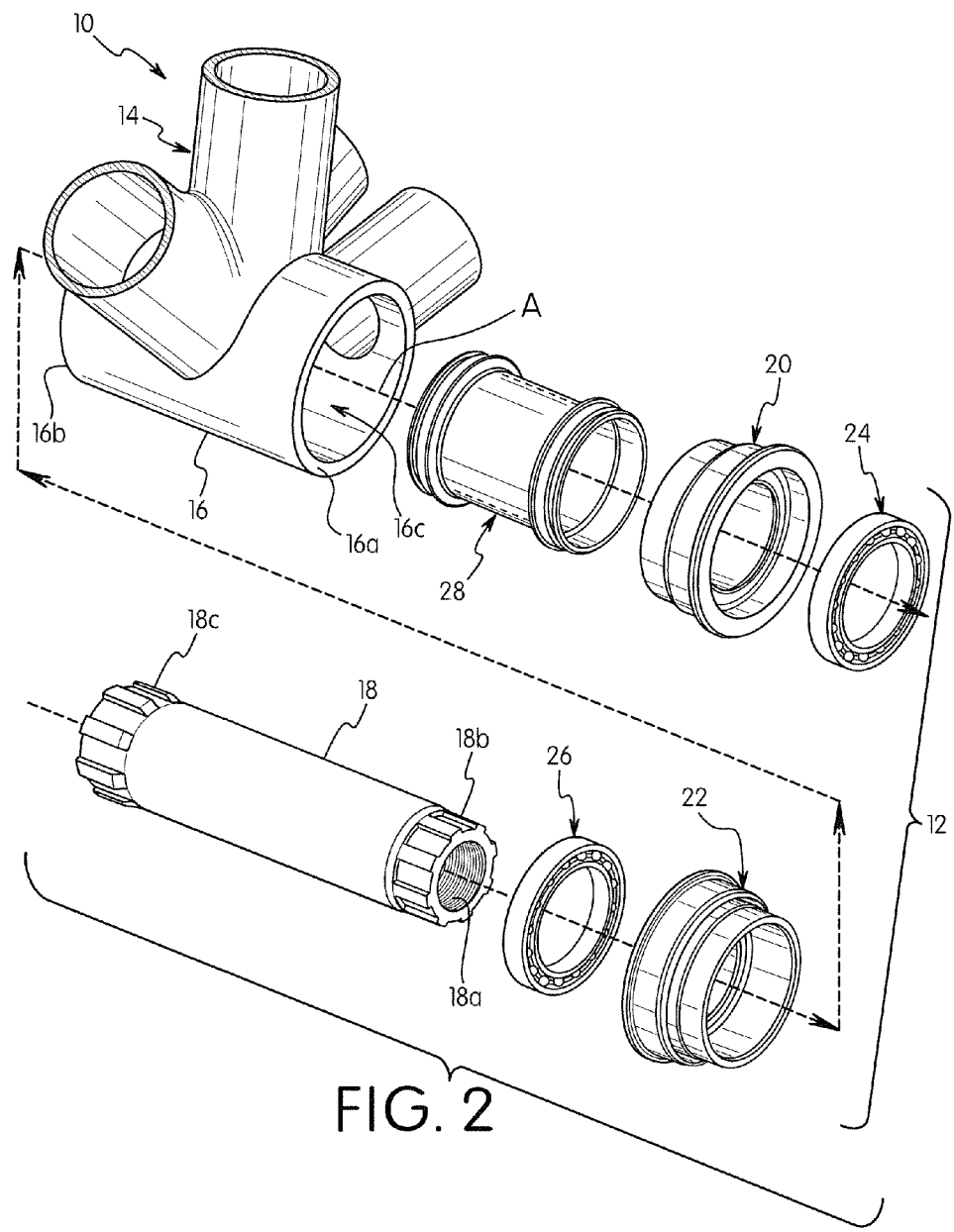
FIG. 2 is an exploded perspective view of the bicycle bottom bracket assembly with the parts of the bottom bracket exploded out of the tubular hanger part of the bicycle frame.
Figure 3:
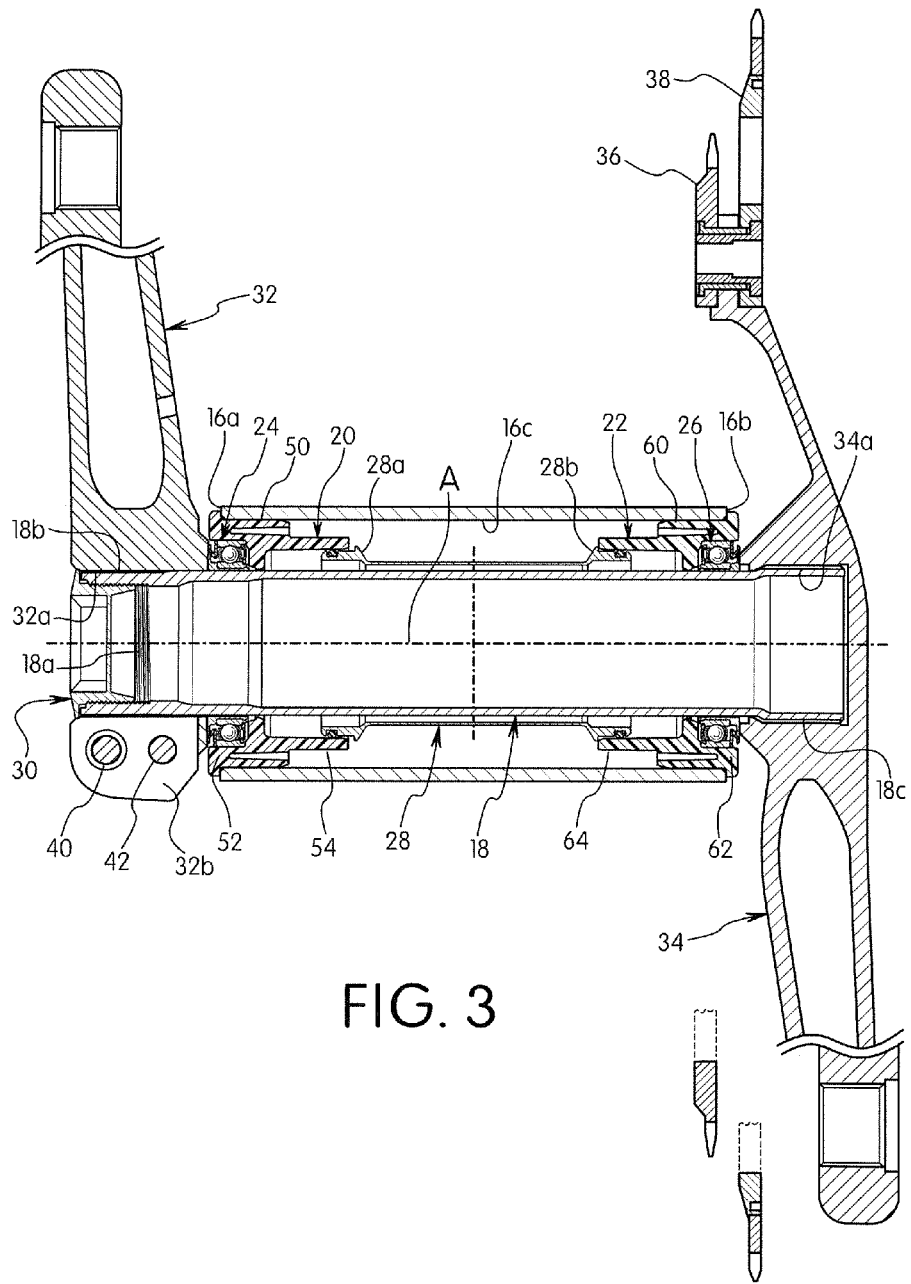
FIG. 3 is a cross sectional view of the bicycle bottom bracket assembly illustrated in FIGS. 1 and 2 with a pair of crank arms mounted to the ends of the crank axle.

Referring initially to FIGS. 1 to 3, a portion of a bicycle 10 is illustrated with frame a bicycle bottom bracket assembly 12 installed a bicycle frame 14 of the bicycle 10 in accordance with one illustrated embodiment. In particular, the bicycle bottom bracket assembly 12 installed in a tubular hanger part 16 of the frame 14 via a press-fit connection as discussed below. The terms "press fitted" or "press fit" as used herein refers to fastening two parts together by friction after the parts are longitudinally pushed together, rather than by any other means of fastening. More preferably, the friction of the press-fit connection that holds the two parts together is preferably increased by compression of one part against the other, which relies on the tensile and compressive strengths of the materials that the two parts are made from.

The tubular hanger part 16 is made of a hard, rigid material that is typically used in manufacturing bicycle frames. The tubular hanger part 16 has a first open end 16a that is unthreaded and a second open end 16b that is unthreaded. A cylindrical surface 16c extends between the first and second open ends 16a and 16b of the tubular hanger part 16.

In the illustrated embodiment, the bicycle bottom bracket assembly 12 includes a crank axle 18, a first support member 20, a second support member 22, a first bearing unit 24, a second bearing unit 26 and a connecting tube member 28. Basically, in the illustrated embodiment, the first and second support members 20 and 22 are identical, and press-fitted into the first and second open ends 16a and 16b of the tubular hanger part 16, respectively. The first and second bearing its 24 and 26 are identical, and press-fitted into the first and second support members 20 and 22, respectively. The first and second bearing its 24 and 26 are configured and arranged to rotatably support the crank axle 18 within the tubular hanger part 16 about the rotational axis A. While the first and second bearing units 24 and 26 are illustrated as being identical, it will be apparent to those skilled in the bicycle field that the first and second bearing units 24 and 26 can be different if needed and/or desired. Likewise, while the first and second support members 20 and 22 are illustrated as being identical, it will be apparent to those skilled in the bicycle field that the first and second support members 20 and 22 can be different if needed and/or desired.

Preferably, the crank axle 18 is removable from the first and second bearing units 24 and 26 in an axial direction of the rotational axis A without removing the first and second bearing units 24 and 26 from the first and second support members 20 and 22. In the illustrated embodiment, the crank axle 18 is a hollow pipe-shaped member that is highly rigid. For example, the crank axle 18 is made of a metallic material as chrome molybdenum steel. As shown in FIG. 2, a first or left end portion of the crank axle 18 includes a female or internal thread 18a and a plurality of external splines or serrations 18b.

As shown in FIG. 3, the female (internal threads) thread 18a is disposed on an inner circumferential surface of the left end portion of the crank axle 18 so that a fastening bolt 30 is screwed into the female thread 18a to fasten a left crank arm 32. The serrations 18b are provided on the outer circumferential surface of the left end portion of the crank axle 18 to non-rotatably secure the left crank arm 32 thereon. As shown in FIGS. 3 and 1, a second or right end portion of the crank axle 18 includes a plurality of external splines or serrations 18c to non-rotatably secure a right crank arm 34. The right crank arm 34 is crimped onto the crank axle 18 in a conventional manner. Of course, the crank arms 32 and 34 can be attached to the crank axle 18 in any suitable manner (e.g., threads, crimping, bonding, welding, etc.). In the illustrated embodiment, the left crank arm 32 is removably fastened to the left end of the crank axle 18, while the right crank arm 34 is preferably fixed to the right end of the crank axle 18 so that the right crank arm 34 is integrally coupled to the crank axle 18 through a splined-connection. Alternatively, the right crank arm 34 may be designed to be removably fastened to the right end crank axle 18 as with the left crank arm 32. The pedals are mounted to the tip or free ends of the left and right crank arm 32 and 34.

As seen in FIG. 3, left crank arm 32 includes a splined connecting hole 32a that is non-rotatably connected on the serrations 18b of the crank axle 18. The left crank arm 32 is fixedly coupled to the crank axle 18 by the fastening bolt 30 that is screwed on the female thread 18a of the crank axle 18. The right crank atm 34 is a gear crank that has two chain rings or sprockets 36 and 38 mounted thereon in a removable manner by a crank connecting part. The right crank arm 34 includes a splined connecting hole 34a that is non-rotatably connected on the serrations 18c of the crank axle 18. In particular, the connecting holes 32a and 34a has a plurality of splines or serrations so that the crank arms 32 and 34 are non-rotatably coupled to the crank axle 18 at a certain rotational phase so that the crank arms 32 and 34 extend in opposite directions.

A slit 32b is formed on the connecting hole 32a of the left crank arm 32 that is mounted on the crank axle 18. The left crank arm 32 is strongly fixed on the crank axle 18 by tightening up two mounting bolts 40 and 42 that are located on the bottom of the crank axle 18 as seen in FIG. 2. Thus, the slit width of the slit 32b is narrowed by tightening the mounting bolts 40 and 42 that extend across the slit 32b to strongly fix the left crank arm 32 on the crank axle 18. These two mounting bolts bolts 40 and 42 are, for example, hexagon socket head bolts, and their heads are preferably inserted from different directions.

Turning now to FIG. 4, the first support member 20 will now be discussed in more detail. In the illustrated embodiment, the first support member 20 is constructed of a non-metallic material that is injection molded as a one-piece, unitary member. The first support member 20 has a uniform longitudinal cross sectional profile with respect to the axial direction in the illustrated embodiment. In other words, the longitudinal cross sectional profile shown in FIG. 4 is the same for every longitudinal cross section taken along the rotational axis A.

In the illustrated embodiment, as seen in FIG. 4, the first support member 20 includes a first hanger mounting part 50, a first bearing mounting part 52 and a first connecting tube mounting part 54. The first hanger mounting part 50 is dimensioned to be press-fitted into the first open end 16a of the tubular hanger part 16, while the first bearing mounting part 52 is dimensioned retain the first bearing unit 24 therein via a press-fit. The first connecting tube mounting part 54 is dimensioned to receive a first end 28a of the connecting tube member 28 as seen in FIG. 4.

The first hanger mounting part 50 has a first outer circumferential surface 50a that is configured and arranged to be press-fitted into the first open end 16a of the hanger part 16 of the bicycle frame 14. The first outer circumferential surface 50a is a non-threaded surface. The first hanger mounting part 50 also has an annular abutment 50b and an inner end 50c. The annular abutment 50b projects outward from the first outer circumferential surface 50a in a radial direction. As seen in FIG. 3, the annular abutment 50b abuts against the first open end 16a of the hanger part 16 of the bicycle frame 14.

The first hanger mounting part 50 has a first slit 50d that forms an annular space that at least partially surrounds the first bearing mounting part 52 and that at least partially surrounds the first connecting tube mounting part 54. With the first slit 50d being provided in the first hanger mounting part 50, it is possible to absorb dimensional tolerance about the inner diameter of the first open end 16a of the hanger part 16 of the bicycle frame 14. In the illustrated embodiment, the first slit 50d is shaped into a continuous annular ring. The first slit 50d has a closed axial outermost end 50e and an open axial innermost end 50f. The first slit 50d tapers from the open axial innermost end 50f to the closed axial outermost end 50e such that a radial dimension of the first slit 50d becomes smaller as the first slit 50d approaches the closed axial outermost end 50e. The open axial innermost end 50f of the first slit 50d corresponds to the inner end 50c. The closed axial outermost end 50e of the first slit 50d is located directly outward of the first bearing unit 24 in a radial direction relative to the rotational axis A of the first bearing unit 24. Thus, the first slit 50d extends in an axial direction relative to the rotational axis A of the first bearing unit 24 from the open axial innermost end 50f of the first slit 50d at least up to a region that is located radially outward from the first bearing unit 24 in the radial direction relative to the rotational axis A of the first bearing unit 24. In this way, the closed axial outermost end 50e of the first slit 50d is located directly outward from the first bearing unit 24 in the radial direction relative to the rotational axis A of the first bearing unit 24. In other words, the first slit 50d extends so that the closed axial outermost end 50e of the first slit 50d is positioned between the first outer circumferential surface 50a and the first bearing mounting part 52.

The first bearing mounting part 52 has a recess that is defined by a circumferential surface 52a and an axially facing surface 52b. The circumferential surface 52a is dimensioned to be equal to or slightly smaller than the outer diameter of the first bearing unit 24 so that the first bearing unit 24 is retained in the recess of the first bearing mounting part 52 by a press-fit. The closed axial outermost end 50e of the first slit 50d is positioned radially between the first outer circumferential surface 50a of the first hanger mounting part 50 and the circumferential surface 52a of the first bearing mounting part 52.

The first connecting tube mounting part 54 has an inner peripheral surface 54a and an outer peripheral surface 54b. The inner peripheral surface 54a is sized to receive the first end 28a of the connecting tube member 28. The outer peripheral surface 54b has a smaller outer diameter than the first outer circumferential surface 50a.

Turning now to FIG. 5, the second support member 22 will now be discussed in more detail. In the illustrated embodiment, the second support member 22 is constructed of a non-metallic material that is injection molded as a one-piece, unitary member. The second support member 22 has a uniform longitudinal cross sectional profile with respect to the axial direction in the illustrated embodiment. In other words, the longitudinal cross sectional profile shown in FIG. 5 is the same for every longitudinal cross section taken along the rotational axis A.

In the illustrated embodiment, as seen in FIG. 5, the second support member 22 includes a second hanger mounting part 60, a second bearing mounting part 62 and a second connecting tube mounting part 64. The second hanger mounting part 60 is dimensioned to be press-fitted into the second open end 16b of the tubular hanger part 16, while the second bearing mounting part 62 is dimensioned retain the second bearing unit 26 therein via a press-fit. The second connecting tube mounting part 64 is dimensioned to receive a second end 28b of the connecting tube member 28 as seen in FIG. 5.

The second hanger mounting part 60 has a second outer circumferential surface 60a that is configured and arranged to be press-fitted into the second open end 16b of the hanger part 16 of the bicycle frame 14. The second outer circumferential surface 60a is a non-threaded surface. The second hanger mounting part 60 also has an annular abutment 60b and an inner end 60c. The annular abutment 60b projects outward from the second outer circumferential surface 60a in a radial direction. As seen in FIG. 3, the annular abutment 60b abuts against the second open end 16b of the hanger part 16 of the bicycle frame 14.

The second hanger mounting part 60 has a second slit 60d that forms an annular space that at least partially surrounds the second bearing mounting part 62 and that at least partially surrounds the second connecting tube mounting part 64. With the second slit 60d being provided in the second hanger mounting part 60, it is possible to absorb dimensional tolerance about the inner diameter of the second open end 16b of the hanger part 16 of the bicycle frame 14. In the illustrated embodiment, the second slit 60d is shaped into a continuous annular ring. The second slit 60d has a closed axial outermost end 60e and an open axial innermost end 60f. The second slit 60d tapers from the open axial innermost end to the closed axial outermost end 60e such that a radial dimension of the second slit 60d becomes smaller as the second slit 60d approaches the closed axial outermost end 60e. The open axial innermost end 60f of the second slit 60d corresponds to the inner end 60c. The closed axial outermost end 60e of the second slit 60d is located directly outward of the second bearing unit 26 in a radial direction relative to the rotational axis A of the second bearing unit 26. Thus, the second slit 60d extends in an axial direction relative to the rotational axis A of the second bearing unit 26 from the open axial innermost end 60f of the second slit 60d at least up to a region that is located radially outward from the second bearing unit 26 in the radial direction relative to the rotational axis A of the second bearing unit 26. In this way, the closed axial outermost end 60e of the second slit 60d is located directly outward from the second bearing unit 26 in the radial direction relative to the rotational axis A of the second bearing unit 26. In other words, the second slit 60d extends so that the closed axial outermost end 60e of the second slit 60d is positioned between the second outer circumferential surface 60a and the second bearing mounting part 62.

The second bearing mounting part 62 has a recess that is defined by a circumferential surface 62a and an axially facing surface 62b. The circumferential surface 62a is dimensioned to be equal to or slightly smaller than the outer diameter of the second bearing unit 26 so that the second bearing unit 26 is retained in the recess of the second bearing mounting part 62 by a press-fit. The closed axial outermost end 60e of the second slit 60d is positioned radially between the second outer circumferential surface 60a of the second hanger mounting part 60 and the circumferential surface 62a of the second bearing mounting part 62.

The second connecting tube mounting part 64 has an inner peripheral surface 64a and an outer peripheral surface 64b. The inner peripheral surface 64a is sized to receive the second end 28b of the connecting tube member 28. The outer peripheral surface 64b has a smaller outer diameter than the second outer circumferential surface 60a.

The first bearing unit 24 is an industrial type bearing unit that is press-fitted into the first support member 20 as mentioned above. The first bearing unit 24 is coupled to the first bearing mounting part 52. The first bearing unit 24 includes an outer race 70, an inner race 72 and a plurality of roller elements or balls 74. The roller elements or balls 74 are disposed between the outer and inner races 70 and 72. The first slit 50d extends at least up to a region that is located radially outwardly from the roller elements 74 in the radial direction relative to the rotational axis A of the first bearing unit 24. The first bearing unit 24 is also provided with a pair of conventional seals 78a and 78b.

The second bearing unit 26 is an industrial type bearing unit that is press-fitted into the second support member 22 as mentioned above. The second bearing unit 26 is coupled to the second bearing mounting part 62. The second bearing unit 26 includes an outer race 80, an inner race 82 and a plurality of roller elements or balls 84. The roller elements or balls 84 are disposed between the outer and inner races 80 and 82. The second slit 60d extends at least up to a region that is located radially outwardly from the roller elements 84 in the radial direction relative to the rotational axis A of the second bearing unit 26. The second bearing unit 26 is also provided with a pair of conventional seals 88a and 88b.

The connecting tube member 28 is a tubular member that has an inside diameter that is dimensioned so that the crank axle 18 can pass therethrough. The connecting tube member 28 is fitted to the first and second connecting tube mounting parts 54 and 64 so that the connecting tube member 28 concentrically extends between the first and second support members 20 and 22. Two O-rings 90 and 92 are preferably mounted on the first and second ends 28a and 28b of the connecting tube member 28, respectively as seen in FIGS. 4 and 5. The O-rings 90 and 92 contact the surfaces 54a and 64a to create seals therebetween, respectively, to prevent the ingress of contaminants from entering inside of the first and second support members 20 and 22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired unless otherwise specified. Components that are shown directly connected or contacting each other can have intermediate structures disposed between them unless otherwise specified. The functions of one element can be performed by two, and vice versa unless otherwise specified. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle bottom bracket assembly comprising:
   a first support member including a first hanger mounting part, a first bearing mounting part, and a first connecting tube mounting part;
   a first bearing unit coupled to the first bearing mounting part; and
   the first hanger mounting part having a first outer circumferential surface that is configured and arranged to be press-fitted into a first open end of a hanger part of a bicycle frame, the first connecting tube mounting part having a smaller outer diameter than the first outer circumferential surface, the first hanger mounting part having a first slit extending in an axial direction relative to a rotational axis of the first bearing unit from an open axial innermost end of the first slit at least up to a region that is located radially outwardly from the first bearing unit in a radial direction relative to the rotational axis of the first bearing unit, and the open axial innermost end of the first slit being located at an axially innermost end of the first outer circumferential surface with respect to the rotational axis of the first bearing unit, with the first connecting tube mounting art extending axially inward be outer circumferential surface with respect to the rotational axis of the first bearing unit.

2. The bicycle bottom bracket assembly according to claim 1, wherein
   the first slit is shaped into a continuous annular ring.

3. The bicycle bottom bracket assembly according to claim 1, wherein
   the first slit has a closed axial outermost end.

4. The bicycle bottom bracket assembly according to claim 3, wherein
   the first slit tapers from the open axial innermost end to the closed axial outermost end.

5. The bicycle bottom bracket assembly according to claim 1, wherein
   the first bearing unit includes an outer race, an inner race and at least one roller element disposed between the outer and inner races, the first slit thither extends at least up to a region that is located radially outwardly from the at least one roller element in the radial direction relative to the rotational axis of the first bearing unit.

6. The bicycle bottom bracket assembly according to claim 1, wherein
   the first bearing unit is press-fitted into the first support member.

7. The bicycle bottom bracket assembly according to claim 1, further comprising
   a connecting tube member that is fitted to the first connecting tube mounting part.

8. The bicycle bottom bracket assembly according to claim 1, wherein
   the first support member is constructed of a non-metallic material.

9. The bicycle bottom bracket assembly according to claim 1, further comprising
   a second support member including a second hanger mounting part and a second bearing mounting part and
   a second bearing unit coupled to the second bearing mounting part, and
   the second hanger mounting part having a second outer circumferential surface that is configured and arranged to be press-fitted into a second open end of the hanger part of the bicycle frame.

10. The bicycle bottom bracket assembly according to claim 9, wherein
    the second hanger mounting part has a second slit extending in an axial direction relative to a rotational axis of the second bearing unit from an open axial innermost end of the second slit at least up to a region that is located radially outwardly from the second bearing unit in a radial direction relative to the rotational axis of the second bearing unit.

11. The bicycle bottom bracket assembly according to claim 10, Wherein
    the second support member further includes a second connecting tube mounting part having a smaller outer diameter than the second outer circumferential surface.

12. The bicycle bottom bracket assembly according to claim 11, further comprising
    a connecting tube member that is fitted to the first and second connecting tube mounting parts so that the connecting tube member concentrically extends between the first and second support members.

13. The bicycle bottom bracket assembly according to claim 11, wherein
    the open axial innermost end of the second slit is located at an axially innermost end of the second outer circumferential surface with respect to the rotational axis of the second bearing unit, with the second connecting tube mounting part extending axially inward beyond the second outer circumferential surface with respect to the rotational axis of the second bearing unit.

* * * * *